US012301432B2

(12) United States Patent
Muttreja et al.

(10) Patent No.: US 12,301,432 B2
(45) Date of Patent: May 13, 2025

(54) OPEN FRAMEWORK FOR A UNIVERSAL ORCHESTRATOR FOR A SERVICES PLATFORM IN A 5G WIRELESS NETWORK

(71) Applicant: DISH Wireless L.L.C., Englewood, CO (US)

(72) Inventors: Madhuri Muttreja, Parker, CO (US); Chengcheng Liu, Allen, TX (US)

(73) Assignee: DISH Wireless L.L.C., Englewood, CO (US)

( * ) Notice: Subject to any disclaimer, the term of this patent is extended or adjusted under 35 U.S.C. 154(b) by 153 days.

(21) Appl. No.: 18/107,956

(22) Filed: Feb. 9, 2023

(65) Prior Publication Data

US 2024/0275695 A1   Aug. 15, 2024

(51) Int. Cl.
*H04L 41/50* (2022.01)
(52) U.S. Cl.
CPC .................... *H04L 41/50* (2013.01)
(58) Field of Classification Search
CPC ........................................ H04L 41/50
USPC ............................................. 709/223
See application file for complete search history.

(56) References Cited

U.S. PATENT DOCUMENTS

| | | | | |
|---|---|---|---|---|
| 2011/0022580 A1* | 1/2011 | Badulescu | ............ | H04L 67/306 707/E17.001 |
| 2020/0162870 A1* | 5/2020 | Stammers | ................. | G06F 9/54 |
| 2021/0334146 A1* | 10/2021 | Kulkarni | ................... | G06F 8/31 |
| 2023/0379221 A1* | 11/2023 | Draznin | .................. | H04L 41/40 |
| 2024/0193655 A1* | 6/2024 | Basi | .................... | G06Q 30/0613 |
| 2024/0223446 A1* | 7/2024 | Parker | ................. | H04L 41/0886 |

OTHER PUBLICATIONS

Sonkoly et al., 5G Applications From Vision to Reality: Multi-Operator Orchestration, Jul. 2020, https://ieeexplore.ieee.org/stamp/stamp.jsp?tp=&arnumber=9115829 (Year: 2020).*
Madhuri Muttreja et al., "Open Framework for a Universal Orchestrator for a Services Platform in a 5G Wireless Network," U.S. Appl. No. 18/107,964, filed Feb. 9, 2023. (48 Pages).

* cited by examiner

*Primary Examiner* — James E Springer
(74) *Attorney, Agent, or Firm* — Jeremiah J. Baunach; Frontier IP Law PLLC

(57) ABSTRACT

Example embodiments are directed towards an open framework for an open framework for a universal orchestrator for a services platform in a 5G wireless network. The open framework provides a unified configuration-oriented template pattern and a built-in engine that enables recursive usage from multiple layers of service relay. This supports programmable and scalable network service with dynamic service updates and synchronization crossing network domains and service producers (e.g., network service vendors) while facilitating a northbound service innovation ecosystem by converting/mapping the technical oriented services to a general purpose user journey. The framework determines a plurality of applicable technical services for provisioning the network service request based on the mapping of the technical service categories and dependencies between technical services from different domain and infrastructure layer.

20 Claims, 11 Drawing Sheets

OPEN FRAMEWORK FOR A UNIVERSAL ORCHESTRATOR FOR A SERVICES PLATFORM IN A 5G WIRELESS NETWORK

BRIEF SUMMARY

The traditional framework and pattern for building cellular wireless networks causes traditional communication service providers (CSP) to spend a major percentage of their budget on integration and routing operations with no unified service framework. This leaves little or no bandwidth for innovative new services and technologies crossing network domains and network service vendors or for building abilities leveraging service producers from data platforms and other third parties.

From the general service consumer point of view, traditionally there has been no bridge over the gap between the network service consumer and the network service producer that would map/convert pure technical services, which are isolated and separated across multiple domains among the infrastructure, to non-technical requirements of the service consumer based on business logic (e.g., a general purpose user journey) to help form the service ecosystem.

In particular, traditional business support systems (BSS)/operations support systems (OSS) integration with new network elements for operational procedures were tightly coupled. The network orchestration needed to reach out to each individual network function (NF) with fixed customized steps by mimicking manual procedures for each individual use case. This provided no flexibility to support the variation of service consumers' needs. Meanwhile, since each NF/domain controller is also a moving target on the network service producer side, this traditionally resulted in significant cost, complexity and endless maintenance efforts. The end service user faced a gap to make full use of pure technical services to support quick customization and assembly for vertical industries.

In order to solve the above technical problems, disclosed herein is an open framework for a universal orchestrator in a 5G Service Platform. The open framework provides a unified configuration-oriented template pattern and a built-in engine that enables recursive usage from multiple layers of service relay. This supports programmable and scalable network service with dynamic service updates and synchronization crossing network domains and service producers (e.g., network service vendors) while also facilitating a northbound service innovation ecosystem by converting/mapping the technical oriented services to a general purpose user journey.

In one example embodiment, the framework maps a plurality of wireless network underlying technical service categories to a plurality of corresponding user template selectable options that are based on business logic for provisioning network service requests. The underlying technical service categories are associated with underlying different technical services which cross a plurality of network domains and a plurality of network service providers that provide the underlying technical services. The framework provides a user interface that includes selectable options mapping to business requirements, then the framework does service discovery, mapping and conversion to assemble a service request as subject to processing further for deployment and orchestration.

The framework determines a plurality of applicable technical services for provisioning the network service request based on the mapping of the technical service categories and dependencies between different technical services. In an example embodiment, this may include determining that the dependencies indicate a first technical service required for provisioning the network service is dependent on one or more additional technical services in one or more corresponding different network domains. The framework then selects a sub-set of technical services including the first technical service and the one or more additional technical services in one or more corresponding different network domains based on the dependencies.

The framework generates one or more service orders for the network service based on the determined plurality of applicable technical services and available network resources indicated by network inventory. The framework then provisions the network service by inputting the one or more service orders to a configuration-driven universal network orchestrator having an open framework that enables recursive usage from multiple layers of service relay.

The framework may receive, at the configuration-driven universal network orchestrator, run-time feedback including closed loop service monitoring regarding operation of the network service, enabling the configuration-driven universal network orchestrator to make applicable adjustments in the provisioning of the network service. In an example embodiment, this may include, for each applicable technical service of the determined plurality of applicable technical services, receiving operation payload data regarding run-time status of the network service from a respective service provider that provides the applicable technical service. The feedback may be part of a closed loop through the configuration-driven universal network orchestrator to make adjustments in the provisioning of the network service during run-time.

In an example embodiment, an instance of the configuration-driven universal network orchestrator may be reused by one or more of the plurality of network service providers. This enables each network service provider of the one or more of the plurality of network service providers to repeat the universal network orchestrator within a system of the network service provider and provide an underlying technical service by recursively utilizing the instance of the universal network orchestrator.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
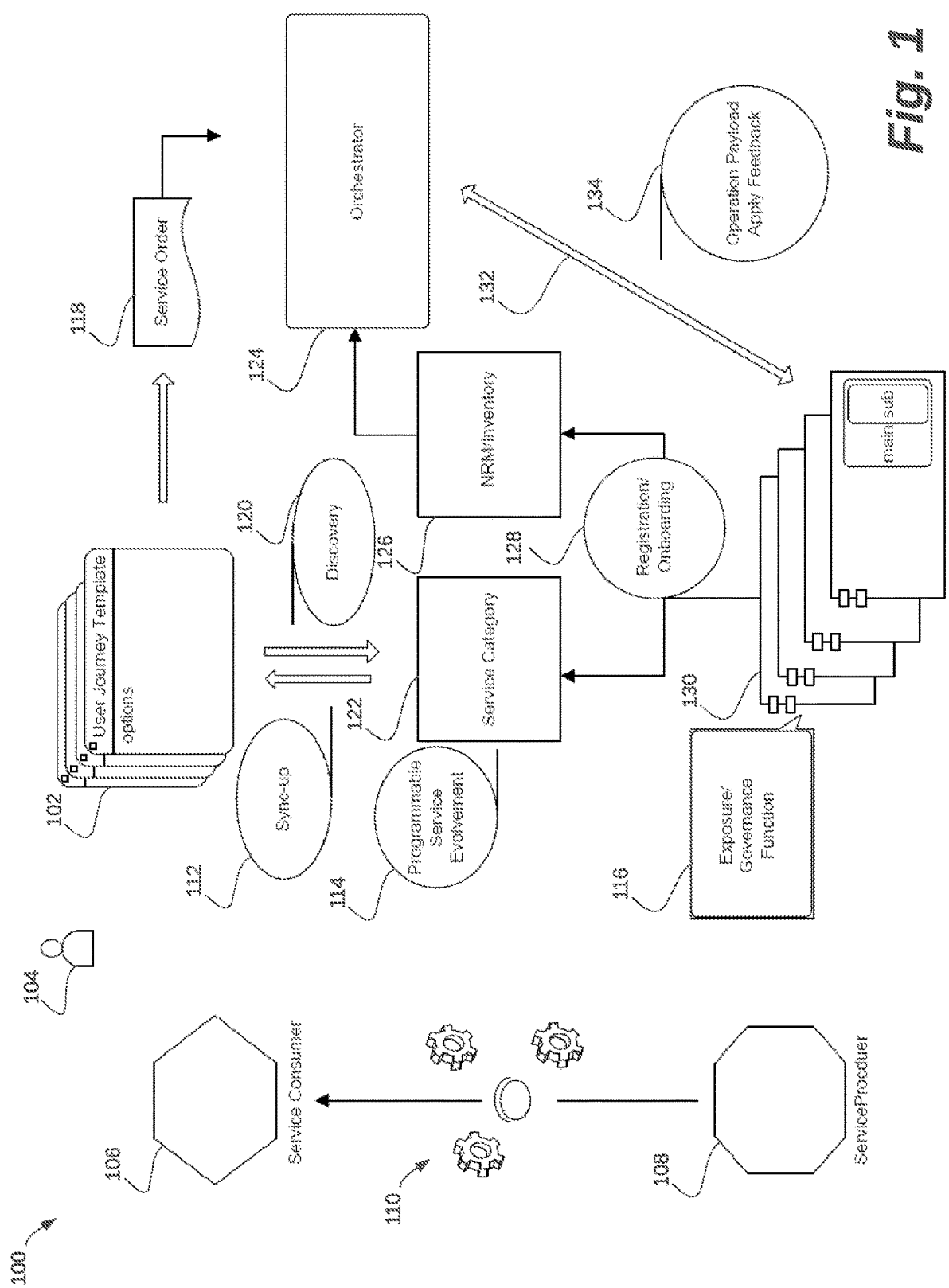
FIG. 1 illustrates a diagram of an example system architecture overview of a system implementing an open framework for a universal orchestrator in a 5G service platform in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Fifth Generation (5G) wireless technology provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points. 5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations. The convergence of the RAN and core networks enables operators to leverage new approaches to network testing and validation.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off—the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Traditionally, BSS/OSS integration with new network elements for operational procedures were tightly coupled. The network orchestration needed to reach out to each individual NF with fixed customized steps by mimicking manual procedures for each individual use case. This provided no flexibility to support the variation of service consumers' needs. Meanwhile, since each NF/domain controller is also a moving target on the network service producer side, this traditionally resulted in significant cost, complexity and endless maintenance efforts. The end service user faced a gap to make full usage of pure technical service to support application development from vertical industries.

To address the above issues, disclosed herein is an open framework for a universal orchestrator in a 5G service platform that intelligently utilizes, in a novel way, various features of 5G networks described above regarding the dynamic, coherent and flexible framework of multiple advanced technologies supporting a variety of applications, as well as the disaggregated, flexible and virtualized RAN with interfaces creating additional data access points. FIG. 1 illustrates a diagram of an example system architecture overview of a system implementing an open framework 100 for a universal orchestrator in a 5G service Platform in accordance with embodiments described herein.

According to one example embodiment, shown in FIG. 1 is an open framework 100 for a configuration-driven universal network orchestrator 124 in wireless cellular network service coordination. Wireless service consumers, which may include enterprise organizations, CSPs, mobile network operators (MNOs) may build their own private Long-Term Evolution (LTE), Fifth-Generation (5G) and Sixth-Generation (6G) wireless networks using such an open framework 100 to request network services by selecting options via the user journey template 102 facilitated by the virtualization, cloud-native, distributed, disaggregated and "as-a-service" (XaaS) attributes of such cellular wireless networks. Using techniques of the open framework 100 for the configuration-driven universal network orchestrator 124 disclosed herein, 5G and 6G mobile network operators (MNOs) may utilize public cloud providers and private cloud systems, NFs, including containerized network functions (CNF) and virtualized network functions (VNF), and XaaS provided by network service providers 130 to build their wireless networks. Examples of network services provided by the network service providers 120 include, but are not limited to, performing or providing: subscriber provisioning; network slicing; a service level agreement (SLA) optimizer; intelligence providers; and data platform auto-data profilers.

The open framework 100 comprises key management components including service category 122, network resource inventory 126, a registration/onboarding component 128, and a configuration oriented user journey template 102 for a user 104 that bridges 110 the northbound service consumer 106 and southbound service producer 108 (such as network service providers 130). The open framework 100 also includes a built-in service engine in the middle implemented by the configuration-driven universal network orchestrator 124 to form a closed loop that includes closed loop service monitoring via service provider bus 132 regarding operation of the network service. The configuration-driven universal network orchestrator 124 performs intelligent orchestration, scheduling, and service chaining across the network and supports network slicing and network sharing natively. The open framework 100 also enables recursive usage of the orchestrator 118 by the service providers 130, thereby supporting multiple layers of service relay. This provides a programmable and scalable network service with dynamic service updates and synchronization crossing different network domains (e.g., Radio Access Network (RAN), network core, and network slicing engine domains) and service providers (e.g., vendors) while facilitating a northbound service innovation ecosystem by conversion of and mapping of the more technical oriented service to the more general purpose user journey indicated by the selection of options in the user journey template 102. An important aspect of this novel design is based on categorized exposure/governance functions 116 supported by the service producer 108 which may, in some embodiments, be a domain controller/vendor element management system (EMS) that provides a service profile and associated assurance method.

Overall, an EMS may manage specific types of one or more network elements within a telecommunication management network. The service category 122 and Network Resource Model (NRM)/inventory 126 get established and stay in dynamic sync-up 112 with service and resource profile changes from the service providers 130.

In an example embodiment, add-on network services may be reinvented crossing service domains by combining the existing library and joining forces with a service discovery mechanism 120 and the conversion and mapping of the more technical oriented service to the more general purpose user journey based on the service category 122. This supports the northbound user journey template 102 to generate a service order 118 that is input to the configuration-driven universal orchestrator 124 to implement the add-on network services. A service engine of the configuration-driven universal orchestrator 124 may dynamically combine services using the blueprint from the service category 122, using the NRM/Inventory 126 as a knowledge base and using other support functions (e.g. topology, policy to perform decomposition of tasks, task distribution, runtime tracker and feedback management including pattern recognition, visibility support and artificial intelligence (AI) and machine learning operations). Other important functionalities of the service engine of the configuration-driven universal orchestrator 124 include using the service provider bus 132 and an event driven system to orchestrate various network service operations. Such operations may include those to establish pre-processing, task distribution, and a runtime tracker to generate operation payload and apply feedback management 134 to handle pattern recognition, network behavior analysis, visibility support and AI and machine learning operations to support closed loop and add-on services. Further detail regarding such features and the service engine of the configuration-driven universal orchestrator 124 are described with respect to FIG. 2.

Figure 2:
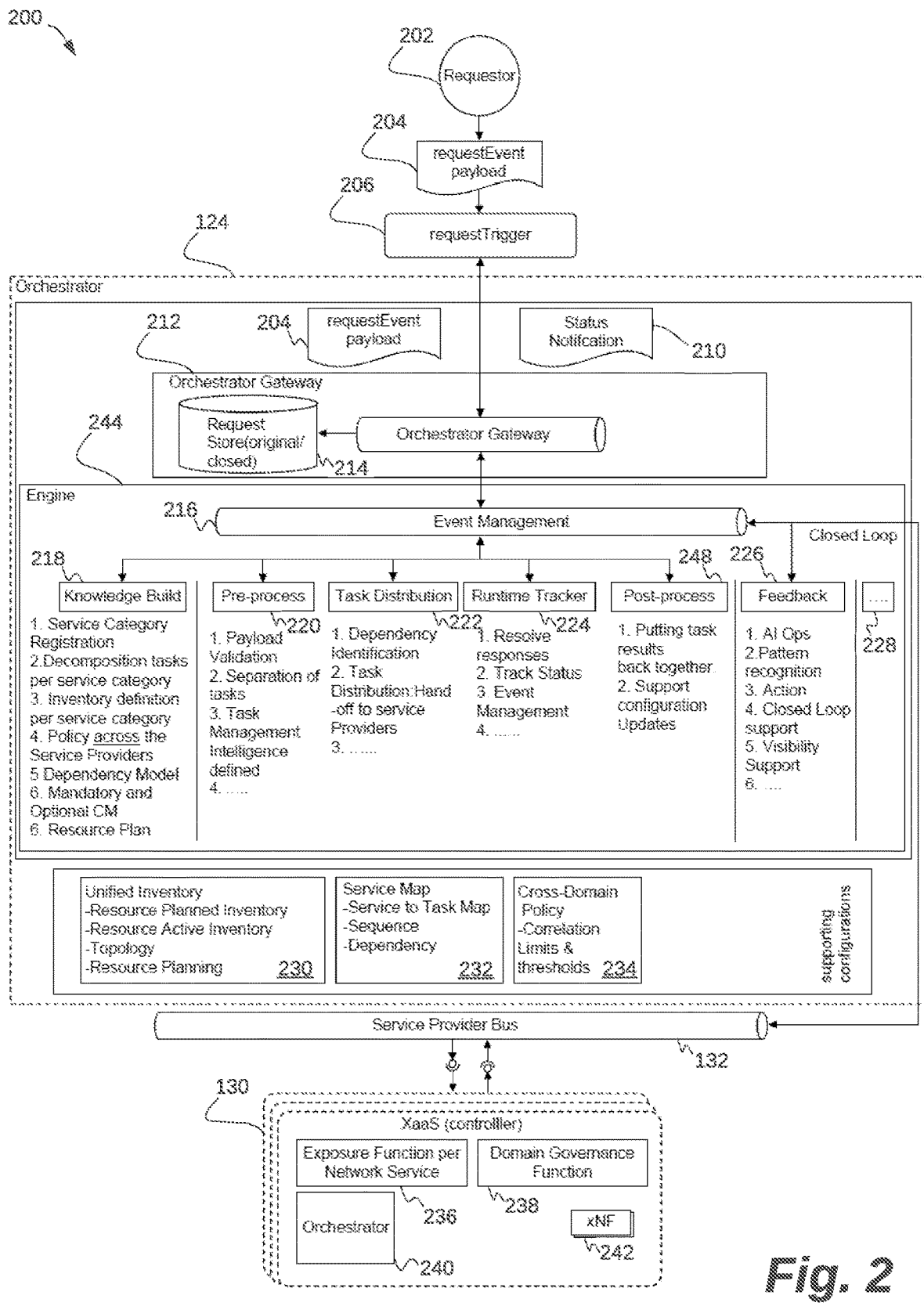
FIG. 2 illustrates a diagram of an example configuration-driven universal orchestrator within the system of FIG. 1 in accordance with embodiments described herein.

FIG. 2 illustrates a diagram of the example configuration-driven universal orchestrator 124 within the system of FIG. 1 in accordance with embodiments described herein.

In an example embodiment, an entire 5G wireless network may be provisioned and updated through the configuration-driven universal orchestrator 124. Every function that a network has to perform may become a service order from a requestor 202 (e.g., the user 104 of FIG. 1) which manifests as a request including a requestEvent payload 204. For example, if the requestor 202 needs to provide a subscription to wireless services to a new customer, that may be provided as a request including requestEvent payload 204 which then comes via a request trigger mechanism 206 as input to the configuration-driven universal network orchestrator 124. In the present example, the configuration-driven universal network orchestrator 124 performs everything that is needed to so that the subscriber is provisioned on the 5G network. The orchestrator gateway 212 is the entry point to the configuration-driven universal network orchestrator 124 and is where all the incoming requests, including the respective requestEvent payload 204, are managed and stored in the request storage 214 (including original and closed requests). The requestEvent payload 204 may include customer related details, such as the primary subscription location.

Based on the information provided in the requestEvent payload, the orchestrator gateway 212 determines where within the network the services need to get provisioned, what network core the subscriber will be associated with, what network slice the subscriber will be associated with, which RAN areas the subscriber will be connected to as a primary home, what emergency (911) telecommunication services the services will be provisioned against, etc., and will also define transport routes. The orchestrator gateway 212 then passes this provisioning information to the knowledge build component 218 of a service engine 244 via the event management component 216 of the service engine 244.

The knowledge build component 218 connected to the event management component 216 performs a knowledge build for provisioning a plurality of network technical services based on the provisioning information and information from the service providers 130 regarding available services received via the service provider bus 132. For example, this may include registering one or more service categories associated with the plurality of network technical services based on the request event payload; decomposing network service tasks per service category of one or more service categories and determining an inventory definition per service category of one or more service categories to determine available network resources.

Performing the knowledge build may also include determining a policy across the plurality of service providers and determining a cross-domain policy 234 across network domains including indications of how RAN, network core, and network slicing engine domains are correlated, as well as indications of domain limits and thresholds to enable provisioning the plurality of network technical services. In some embodiments, the cross-domain policy may be based on an SLA indicating configurations that must be defined. Also, the cross-domain policy may indicate how provisioning a network slice and a data platform service provider work together. A particular domain policy may be stored, defined and/or maintained by a corresponding XaaS (controller) of a particular service provider 130. Each service provider 130 to own their individual autonomous domain policy with which they run and manage. The knowledge build component 218 of the service engine 244 will take these into account when performing the knowledge build. Thus, The service engine 244 using the knowledge build 218 enables the service providers 130 have domain level autonomy.

Performing the knowledge build may also include determining dependencies between the plurality of network technical services based on a dependency model according to a network service map 232 and determining a resource plan for the plurality of network technical services based on the determined inventory definition, the determined policy across the plurality of service providers and determined dependencies. The network service map 232 may include a network service to network task map; a sequence of performance of network tasks; and dependencies indicating which network tasks are dependent on completion of which other network tasks.

Information from the service providers 130 received via the service provider bus 132 to make the above determinations may be based on the exposure function per network service 236, the domain governance function 230 and the network functions (xNF) provided by each of the service providers 130. The exposure function per network service 236, the domain governance function 230 may, in some embodiments, comprise or be part of a domain controller/vendor EMS that provides a service profile and associated assurance method. Performing the knowledge build for provisioning the plurality of network technical services may include determining an inventory definition per service category of the one or more service categories to determine available network resources based on a unified inventory of network resources 230 including a network resource planned inventory; a network resource active inventory; a network topology; and network resource planning data.

After the knowledge build is complete, this may cause a pre-process component 220 of the service engine 244 connected to the event management component 216 to perform, among other possible operations, pre-processing identifying requirements of the plurality of network technical services. This may include, among other operations, validating one or more event management payloads, separating the network service tasks and defining task management intelligence. Based on the pre-processing, the service engine 244 may then communicate, via the event management component 216, one or more event management payloads to a task distribution component 222 connected to the event management component 216. For example, the pre-process component 220 may consult knowledge based build 218 to decompose the order content. In an example embodiment, the particular network services required and dependency between such services may be identified by a joint-force of the options selected via user journey template 102 (shown FIG. 1) and associated service category 122 (shown in FIG. 1). The output of this is the content of the service order 118 where everything regarding the required service had been confirmed before the service order 118 enters the orchestrator 124 to create/perform the runtime instance.

A major function for orchestrator 124 is then to consult NRM/Inventory 126 (shown in FIG. 1) for runtime resource coordination while applying all the associated policy/rules and building up intelligence. Thus, the User Plane Function (UPF)/Access and Mobility Management Function (AMF)/Session Management Function (SMF) combination just needs to be allocated as resources in the current inventory and the associated monitoring services may be predefined as well as the associated governed function toward each NF, which is triggered just by applying applicable rules and service level agreement (SLA) as policy. In one example, in order to provision network services for a particular 5G network service request, the service engine 244 may cause certain tasks to be performed such as provisioning of a network slice, configuring of a 5G Core UPF, AMF and SMF, and defining of applicable RAN elements. Due to SLA requirements some intelligent components (e.g., an intelligence function) are also created to monitor applicable services to meet the SLA requirements. As the pre-process operations occur, messages are posted back to the event management component 216 indicating a payload has been prepared that can go on the service provider bus 132 to indicate to the service providers 132 listening on the service provider bus 132 that they can start reading from these events that get posted after the pre-processing on the service provider bus 132 for relevant tasks to be performed.

Among other possible operations, the task distribution component 222 may distribute, via the service provider bus 132, network service tasks based on the event management payloads to a plurality of service providers 130 listening on the service provider bus 132 connected to the event management component 216. In an example embodiment, the task distribution component 222 identifies dependencies between the network service tasks; determines a sequence of performing the network service tasks based on the determined dependencies; and distributes the network service tasks to particular service providers of the plurality of service providers 130 based on the identified dependencies between the network service tasks and the determined sequence of performing the network service tasks.

A runtime tracker component 224 of the service engine 244 may track status of completion of various distributed network service tasks on which performance of other network service tasks are dependent. The runtime tracker component 224 may resolve responses received via the service provider bus 132 and also perform event management among other possible operations. A post-process component 248 of the service engine 244 may, among other possible operations, confirm the request has been successfully fulfilled and communicate a corresponding status notification 210 via the orchestrator gateway 212. A feedback component 226 of the service engine 244 may, among other possible operations, receive closed loop run-time feedback regarding operation of the requested network service for making network adjustments going forward. In an example embodiment, this may include performing machine learning based on correlations between previous adjustments to network services, which may be based on previous feedback including previous operation payload data regarding run-time status of requested network services from one or more respective service providers 130 and results of the previous adjustments. The feedback component 226 may then receive current feedback including current operation payload data regarding run-time status of the requested network service from one or more respective service providers 130 that perform the network service tasks and then cause or perform additional network adjustments based on the received current feedback and the machine learning.

Thus, the network service providers 130 may act as service providers and service consumers. The configuration-driven universal network orchestrator 124 is built such that it is repeatable and can be used to orchestrate any system, including individual systems of the service providers 130 and be placed in such systems (shown as orchestrator 240) without having to be re-created. In particular, the configuration-driven universal network orchestrator 124 may be embedded into another system as an orchestrator or sub-orchestrator. In an example embodiment, an instance of the configuration-driven universal network orchestrator 124 is provided to one or more of the plurality of network service providers 130, enabling each such network service provider to repeat the configuration-driven universal network orchestrator 124 within a system of the network service provider 130 without re-creating it and provide an underlying technical service by recursively utilizing the instance of the configuration-driven universal network orchestrator 124. Other components 228 of the service engine 244 may also be present in various other embodiments.

Figure 3:
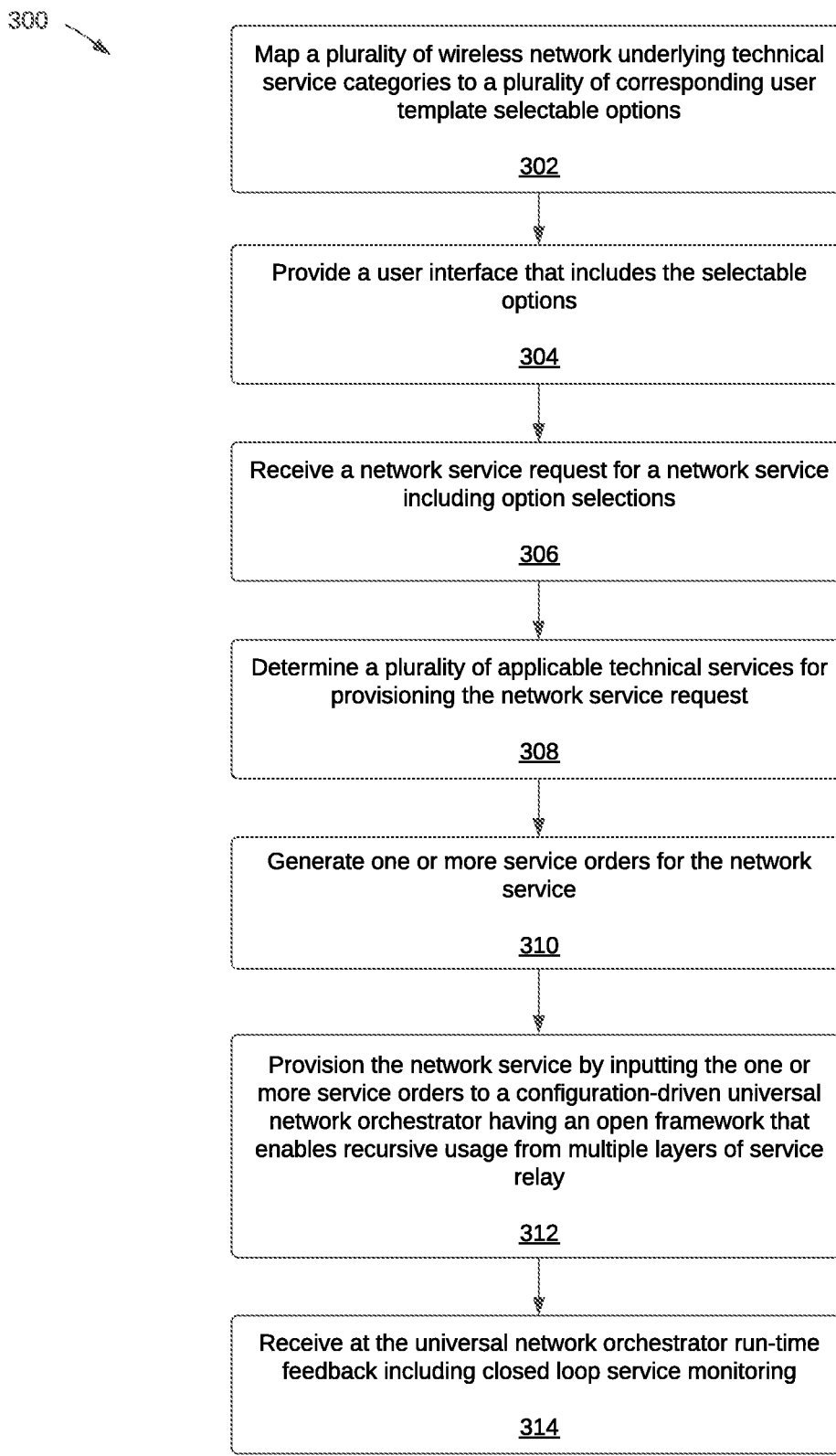
FIG. 3 illustrates a logical flow diagram showing an example embodiment of a process for a system implementing an open framework for a universal orchestrator in a 5G service platform in accordance with embodiments described herein.

FIG. 3 illustrates a logical flow diagram showing an example embodiment of a process 300 for a system implementing an open framework for a universal orchestrator in wireless network deployment in accordance with embodiments described herein. The order of the operations in process 300 do not necessarily need to follow the order provided below and the order of the operations may vary in different embodiments.

At 302, the framework 100 maps a plurality of wireless network underlying technical service categories to a plurality of corresponding user template selectable options that are based on business logic for provisioning network service requests. The underlying technical service categories are associated with underlying different technical services which cross a plurality of network domains and a plurality of network service providers that provide the underlying technical services.

At 304, the framework 100 provides a user interface that includes the selectable options.

At 306, the framework 100 receives a network service request for a network service including option selections of one or more of the selectable options corresponding to requirements of the network service request. At 308, the framework 100 determines a plurality of applicable technical services for provisioning the network service request based on the mapping of the technical service categories and dependencies between different technical services. In an example embodiment, this may include determining that the dependencies indicate a first technical service required for provisioning the network service is dependent on one or more additional technical services in one or more corresponding different network domains. The framework 100 then selects a sub-set of technical services including the first technical service and the one or more additional technical services in one or more corresponding different network domains based on the dependencies.

At 310, the framework 100 generates one or more service orders for the network service based on the determined plurality of applicable technical services and available network resources indicated by network inventory. At 312, the framework 100 provisions the network service by inputting the one or more service orders to a configuration-driven universal network orchestrator having an open framework that enables recursive usage from multiple layers of service relay.

At 314, the framework 100 receives, at the configuration-driven universal network orchestrator, run-time feedback including closed loop service monitoring regarding operation of the network service, enabling the configuration-driven universal network orchestrator to make applicable adjustments in the provisioning of the network service. In an example embodiment, this may include, for each applicable technical service of the determined plurality of applicable technical services, receiving operation payload data regarding run-time status of the network service from a respective service provider that provides the applicable technical service. The feedback may be part of a closed loop through the configuration-driven universal network orchestrator to make adjustments in the provisioning of the network service during run-time.

In an example embodiment, an instance of the configuration-driven universal network orchestrator may be provided to one or more of the plurality of network service providers. This enables each network service provider of the one or more of the plurality of network service providers to repeat the universal network orchestrator within a system of the network service provider and provide an underlying technical service by recursively utilizing the instance of the universal network orchestrator.

Figure 4:
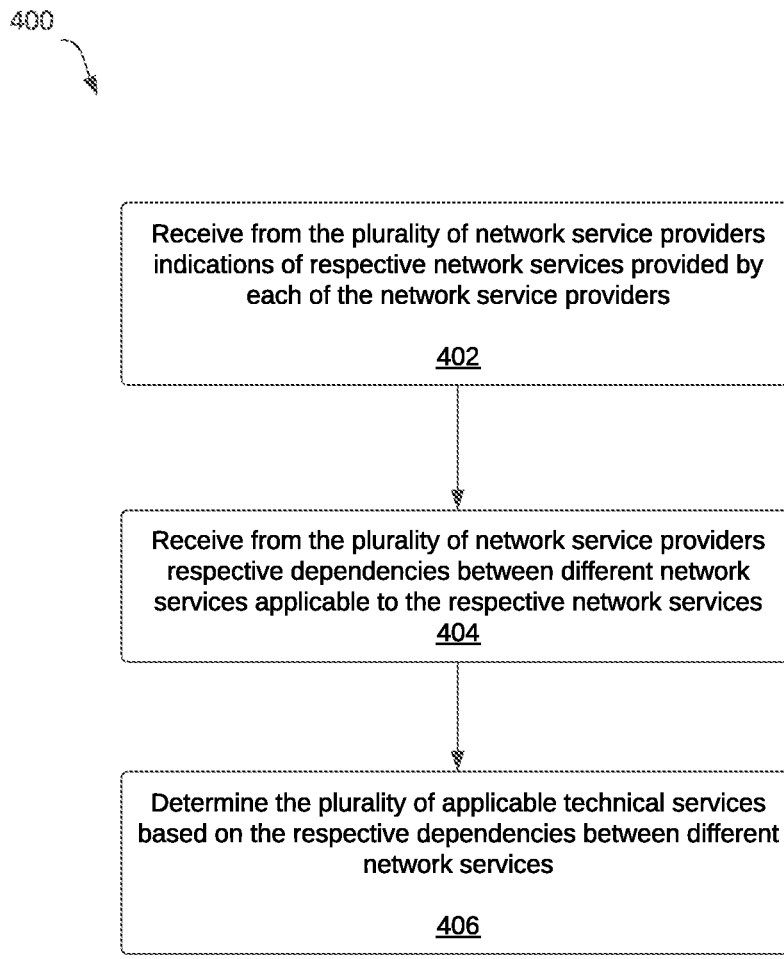
FIG. 4 illustrates a logical flow diagram showing an example embodiment of a process, useful in the process of FIG. 3, for determining a plurality of applicable technical services for provisioning the network service request in accordance with embodiments described herein.

FIG. 4 illustrates a logical flow diagram showing an example embodiment of a process 400, useful in the process 300 of FIG. 3, for determining a plurality of applicable technical services for provisioning the network service request in accordance with embodiments described herein.

At 402, the framework 100 receives from the plurality of network service providers indications of respective network services provided by each of the network service providers.

At 404, the framework 100 receives from the plurality of network service providers respective dependencies between different network services applicable to the respective network services provided by each of the network service providers.

At 406, the framework 100 determines the plurality of applicable technical services based on the respective dependencies between different network services.

Figure 5:
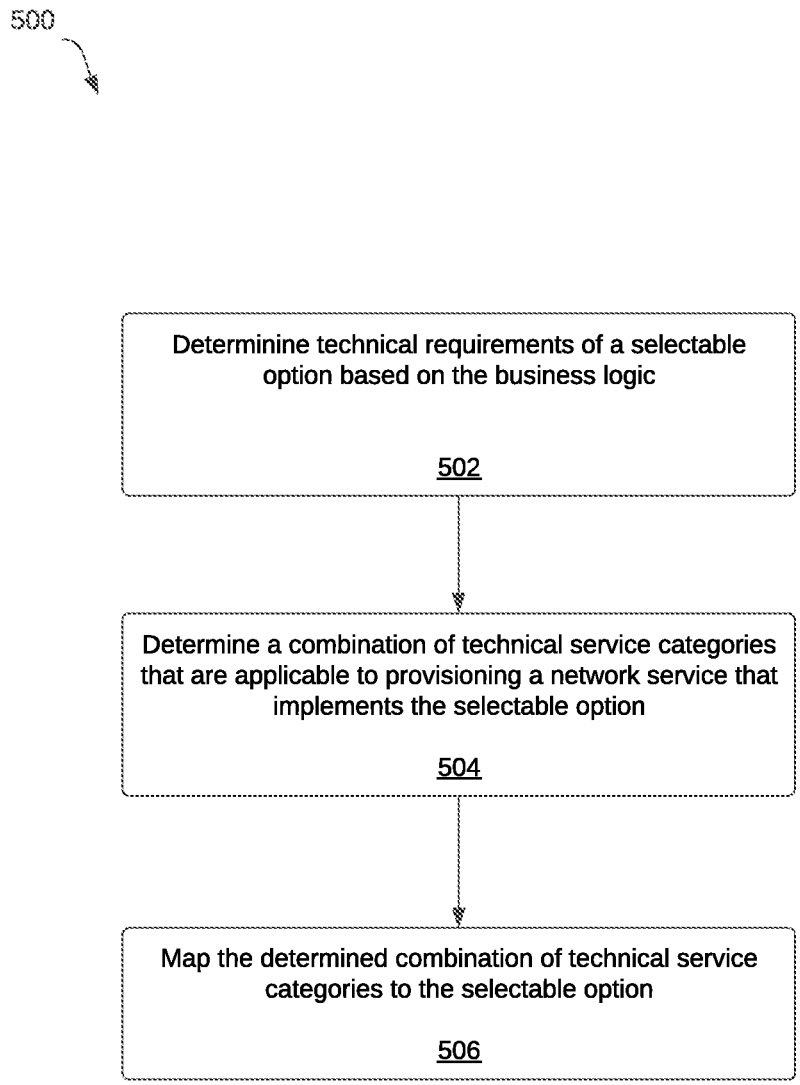
FIG. 5 illustrates a logical flow diagram showing an example embodiment of a process, useful in the process of FIG. 3, for mapping a plurality of wireless network underlying technical service categories to a plurality of corresponding user template selectable options in accordance with embodiments described herein.

FIG. 5 illustrates a logical flow diagram showing an example embodiment of a process 500, useful in the process 300 of FIG. 3, for mapping a plurality of wireless network underlying technical service categories to a plurality of corresponding user template selectable options in accordance with embodiments described herein.

At 502, the framework 100 determines technical requirements of a selectable option based on the business logic.

At 504, the framework 100 determines a combination of technical service categories that are applicable to provisioning a network service that implements the selectable option.

At 506, the framework 100 maps the determined combination of technical service categories to the selectable option.

Figure 6:
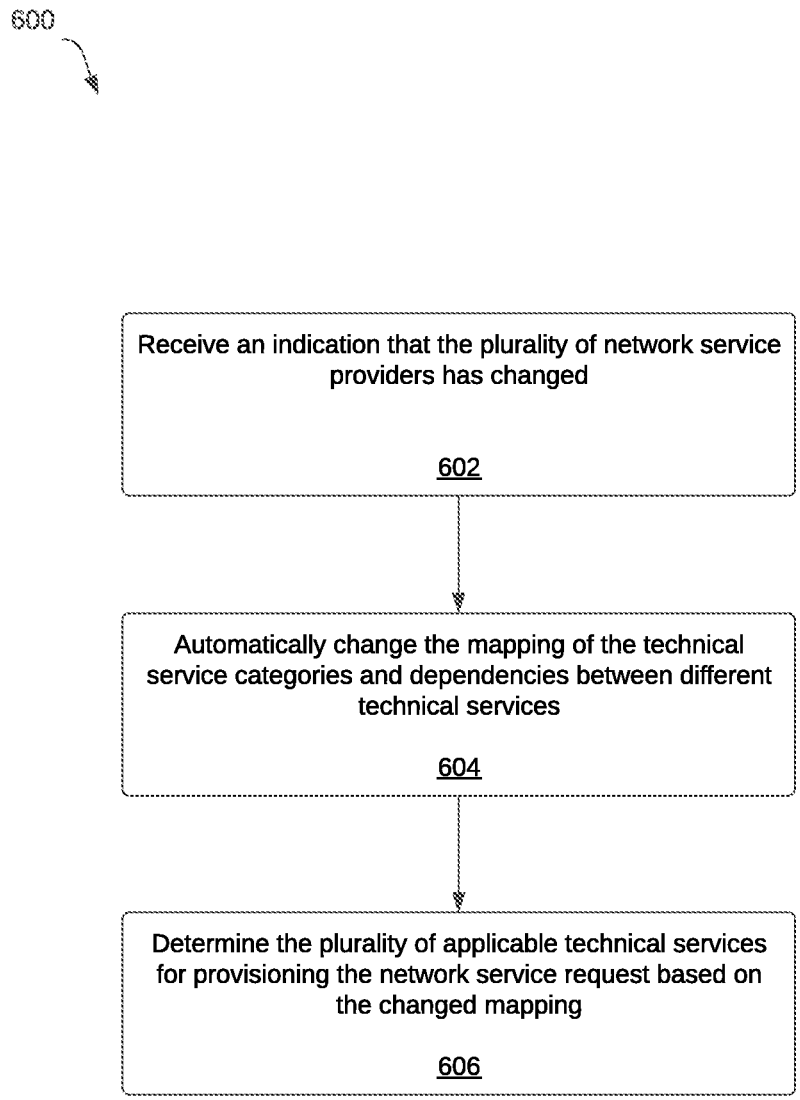
FIG. 6 illustrates a logical flow diagram showing an example embodiment of a process, useful in the process of FIG. 3, for determining a plurality of applicable technical services for provisioning the network service request accommodating changes in network service providers in accordance with embodiments described herein.

FIG. 6 illustrates a logical flow diagram showing an example embodiment of a process 600, useful in the process 300 of FIG. 3, for determining a plurality of applicable technical services for provisioning the network service request accommodating changes in network service providers in accordance with embodiments described herein.

At 602, the framework 100 receives an indication that the plurality of network service providers has changed.

At 604, the framework 100 automatically changes the mapping of the technical service categories and dependencies between different technical services based on the indication that the plurality of network service providers has changed.

At 606, the framework 100 determines the plurality of applicable technical services for provisioning the network service request based on the changed mapping of the technical service categories and dependencies between different technical services.

Figure 7:
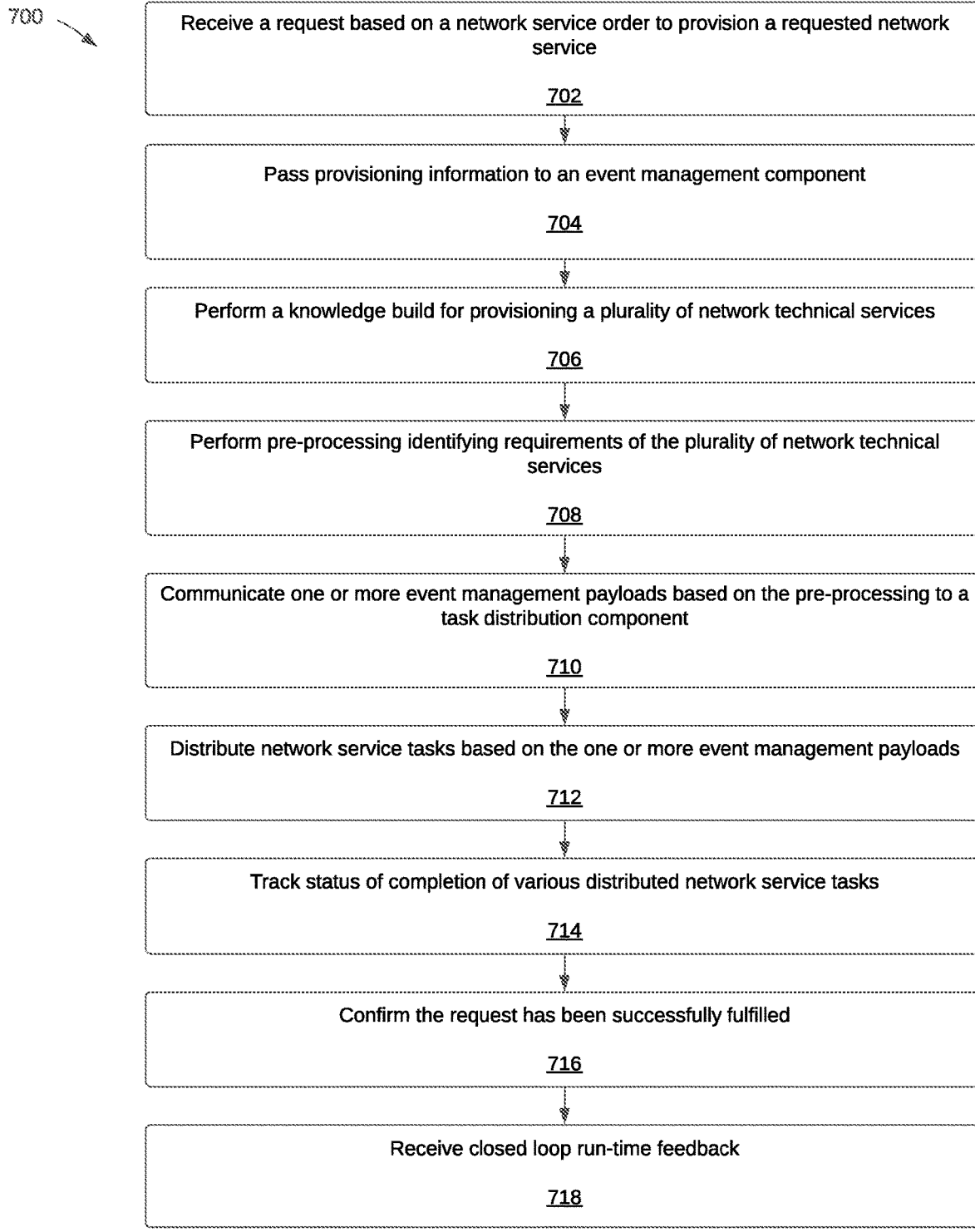
FIG. 7 illustrates a logical flow diagram showing an example embodiment of a process for a configuration-driven universal orchestrator in accordance with embodiments described herein.

FIG. 7 illustrates a logical flow diagram showing an example embodiment of a process 700 for a configuration-driven universal orchestrator in accordance with embodiments described herein.

At 702, the configuration-driven universal network orchestrator 124 receives, at an orchestrator gateway of the configuration-driven universal network orchestrator 124, a request based on a network service order to provision a requested network service, wherein the request includes a request event payload.

At 704, the configuration-driven universal network orchestrator 124 passes provisioning information based on the request event payload to an event management component in a service management engine of the orchestrator. At 706, a knowledge build component of the configuration-driven universal network orchestrator 124 connected to the event management component performs a knowledge build for provisioning a plurality of network technical services based on the provisioning information. For example, this may include determining an inventory definition per service category of the one or more service categories to determine available network resources based on a unified inventory of network resources. In an example embodiment, the unified inventory of network resources includes a network resource planned inventory; a network resource active inventory; a network topology; and network resource planning data.

At 708, after the knowledge build is complete, a pre-process component of the configuration-driven universal network orchestrator 124 connected to the event management component performs pre-processing identifying requirements of the plurality of network technical services. For example, this may include validating the one or more event management payloads; separating the network service tasks; and defining task management intelligence.

At 710, the configuration-driven universal network orchestrator 124 communicates via the event management component one or more event management payloads, based on the pre-processing, to a task distribution component connected to the event management component.

At 712, the task distribution component of the configuration-driven universal network orchestrator 124 distributes network service tasks based on the one or more event management payloads to a plurality of service providers listening on a service provider bus connected to the event management component.

At 714, a runtime tracker component of the configuration-driven universal network orchestrator 124 tracks status of completion of various distributed network service tasks on which performance of other network service tasks are dependent.

At 716, a post-process component of the configuration-driven universal network orchestrator 124 confirms the request has been successfully fulfilled and communicating a corresponding status notification via the orchestrator gateway. For example, this may include putting results of the network service tasks back together and determining whether the request has been successfully fulfilled based on the results of the network service tasks being put back together.

At 718, a feedback component of receives closed loop run-time feedback regarding operation of the requested network service for making adjustments.

The knowledge build component, the pre-process component, the task distribution component, the runtime tracker component, the post-process component and the feedback component the configuration-driven universal network orchestrator 124 may automatically adjust operations based on changes in network service providers on the service provider bus, changes to the unified inventory, changes to a network service map and changes to a cross-domain policy across network domains. The cross-domain policy across network domains may include indications of how RAN, network core, and network slicing engine domains are related to enable provisioning the plurality of network technical services.

Figure 8:
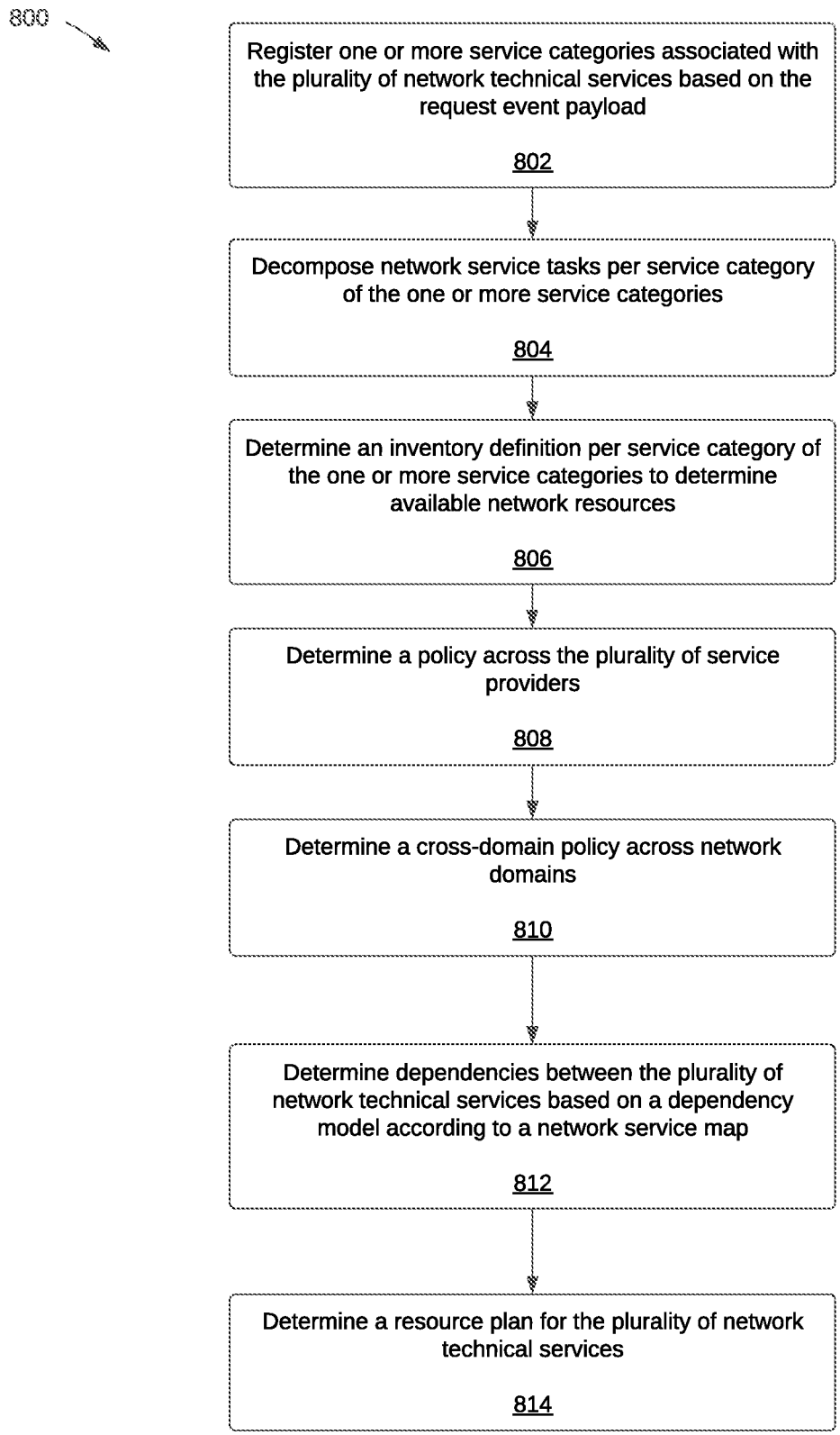
FIG. 8 illustrates a logical flow diagram showing an example embodiment of a process, useful in the process of FIG. 7, for performing a knowledge build for provisioning a plurality of network technical services in accordance with embodiments described herein.

FIG. 8 illustrates a logical flow diagram showing an example embodiment of a process 800, useful in the process 700 of FIG. 7, for performing a knowledge build for provisioning a plurality of network technical services in accordance with embodiments described herein.

At 802, the configuration-driven universal network orchestrator 124 registers one or more service categories associated with the plurality of network technical services based on the request event payload.

At 804, the configuration-driven universal network orchestrator 124 decomposes network service tasks per service category of the one or more service categories.

At 806, the configuration-driven universal network orchestrator 124 determines an inventory definition per service category of the one or more service categories to determine available network resources.

At 808, the configuration-driven universal network orchestrator 124 determines a policy across the plurality of service providers.

At 810, the configuration-driven universal network orchestrator 124 determines a cross-domain policy across network domains including indications of how Radio Access Network (RAN), network core, and network slicing engine domains are related to enable provisioning the plurality of network technical services.

At 812, the configuration-driven universal network orchestrator 124 determines dependencies between the plurality of network technical services based on a dependency model according to a network service map. In an example embodiment, the network service map includes: a network service to network task map; a sequence of performance of network tasks; and dependencies indicating which network tasks are dependent on completion of which other network tasks.

At 814, the configuration-driven universal network orchestrator 124 determines a resource plan for the plurality of network technical services based on the determined inventory definition, the determined policy across the plurality of service providers and determined dependencies.

Figure 9:
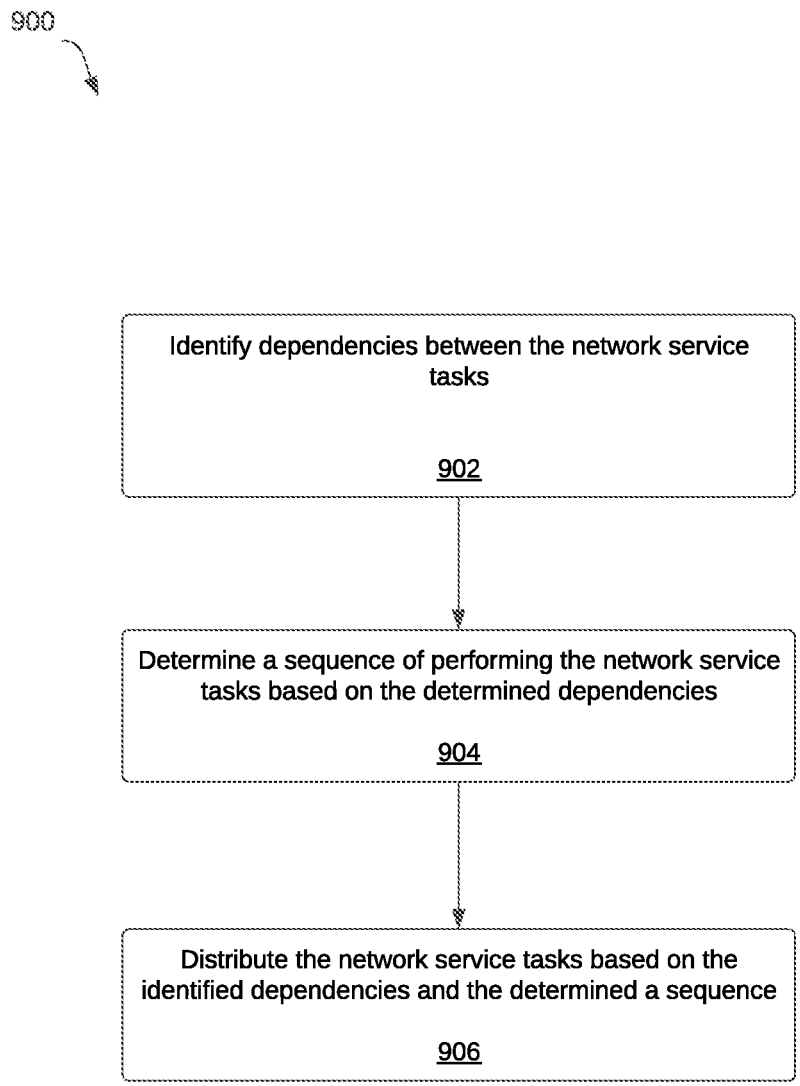
FIG. 9 illustrates a logical flow diagram showing an example embodiment of a process, useful in the process of FIG. 7, for distributing network service tasks in accordance with embodiments described herein.

FIG. 9 illustrates a logical flow diagram showing an example embodiment of a process 900, useful in the process 700 of FIG. 7, for distributing network service tasks in accordance with embodiments described herein.

At 902, the configuration-driven universal network orchestrator 124 identifies dependencies between the network service tasks.

At 904, the configuration-driven universal network orchestrator 124 determines a sequence of performing the network service tasks based on the determined dependencies.

At 906, the configuration-driven universal network orchestrator 124 distributes the network service tasks to particular service providers of the plurality of service providers based on the identified dependencies between the network service tasks and the determined sequence of performing the network service tasks.

Figure 10:
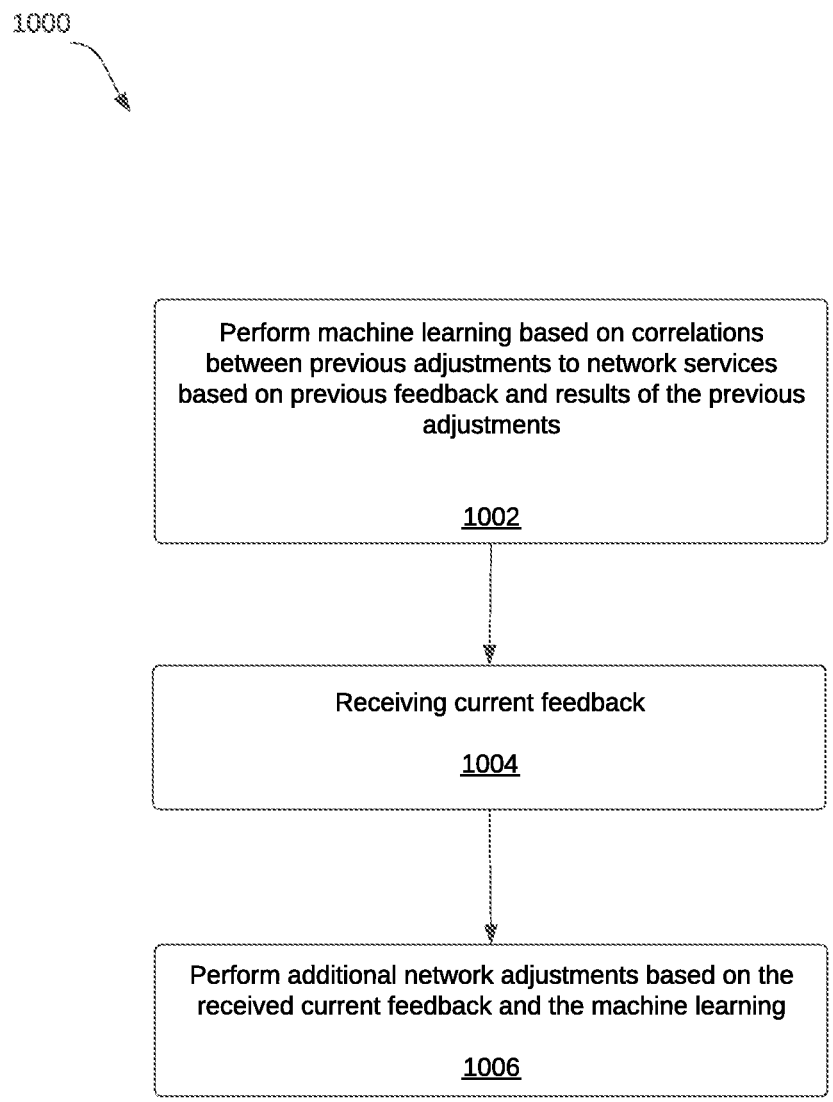
FIG. 10 illustrates a logical flow diagram showing an example embodiment of a process, useful in the process of FIG. 7, for performing network adjustments based on received feedback in accordance with embodiments described herein.

FIG. 10 illustrates a logical flow diagram showing an example embodiment of a process 1000, useful in the process 700 of FIG. 7, for performing network adjustments based on received feedback in accordance with embodiments described herein.

At 1002, the configuration-driven universal network orchestrator 124 performs machine learning based on correlations between previous adjustments to network services based on previous feedback including previous operation payload data regarding run-time status of requested network services from one or more respective service providers and results of the previous adjustments.

At 1004, the configuration-driven universal network orchestrator 124 receives current feedback including current operation payload data regarding run-time status of the requested network service from one or more respective service providers that perform the network service tasks.

At 1006, the configuration-driven universal network orchestrator 124 performs additional network adjustments based on the received current feedback and the machine learning.

Figure 11:
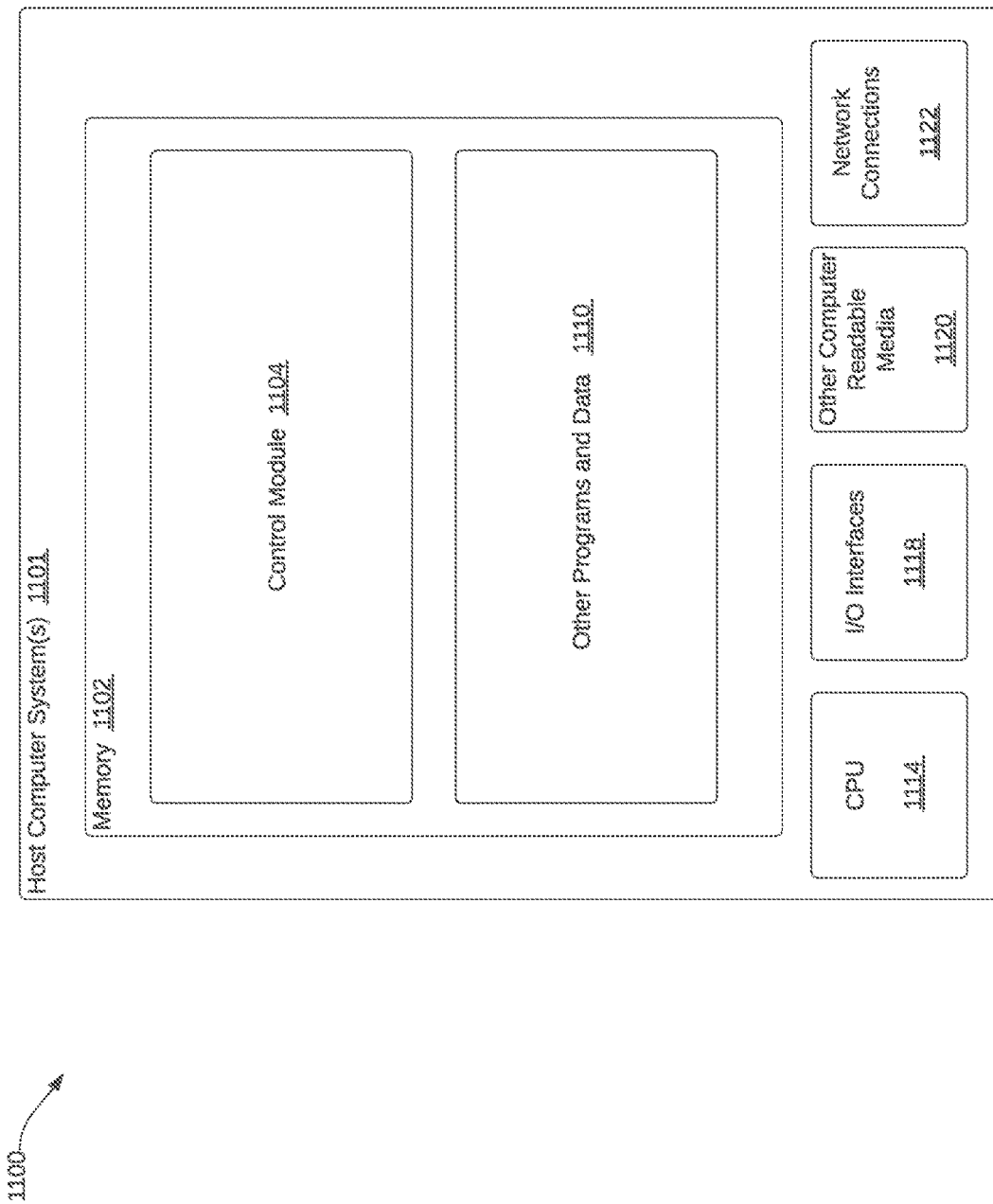
FIG. 11 shows a system diagram that describes an example implementation of a computing system(s) for implementing embodiments described herein.

FIG. 11 shows a system diagram that describes an example implementation of a computing system(s) 1100 for implementing embodiments described herein.

The functionality described herein for an open framework for a universal orchestrator in wireless network deployment, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 11 illustrates an example of underlying hardware on which such software and functionality may be hosted and/or implemented.

In particular, shown is example host computer system(s) 1101. For example, such computer system(s) 1101 may represent one or more of those in various data centers, base stations and cell sites shown and/or described herein that are, or that host or implement the functions of: routers, components, microservices, virtual machines, and other aspects described herein to implement an open framework for a universal orchestrator in wireless network deployment. In some embodiments, one or more special-purpose computing systems may be used to implement the functionality described herein. Accordingly, various embodiments described herein may be implemented in software, hardware, firmware, or in some combination thereof. Host computer system(s) 1101 may include memory 1102, one or more central processing units (CPUs) 1114, I/O interfaces 1118, other computer-readable media 1120, and network connections 1122.

Memory 1102 may include one or more various types of non-volatile and/or volatile storage technologies. Examples of memory 1102 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1102 may be utilized to store information, including computer-readable instructions that are utilized by CPU 1114 to perform actions, including those of embodiments described herein.

Memory 502 may have stored thereon control module(s) 1104. The control module(s) 1104 may be configured to implement and/or perform some or all of the functions of the systems, components and modules described herein for an open framework for a universal orchestrator in wireless network deployment. Memory 1102 may also store other programs and data 1110, which may include rules, databases, application programming interfaces (APIs), software containers, nodes, pods, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1122 are configured to communicate with other computing devices to facilitate the functionality described herein. In various embodiments, the network connections 1122 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1118 may include a video interfaces, other data input or output interfaces, or the like. Other computer-readable media 1120 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
mapping a plurality of wireless network underlying technical service categories to a plurality of corresponding user template selectable options that are based on business logic for provisioning network service requests, wherein the mapping includes mapping each wireless network underlying technical service category of the plurality of wireless network underlying technical service categories to a respective corresponding user template selectable option of the plurality of corresponding user template selectable options and the underlying technical service categories are associated with underlying different technical services which cross a plurality of network domains and a plurality of network service providers that provide the underlying technical services;
providing a user interface that includes the selectable options;
receiving a network service request for a network service including option selections of one or more of the selectable options corresponding to requirements of the network service request;
determining a plurality of applicable technical services for provisioning the network service request based on the mapping of the technical service categories and dependencies between different technical services;
generating one or more service orders for the network service based on the determined plurality of applicable technical services and available network resources indicated by network inventory;
provisioning the network service by inputting the one or more service orders to a configuration-driven universal network orchestrator having an open framework that enables recursive usage from multiple layers of service relay; and
receiving at the universal network orchestrator run-time feedback including closed loop service monitoring regarding operation of the network service, enabling the configuration-driven universal network orchestrator to make applicable adjustments in the provisioning of the network service.

2. The method of claim 1 wherein the determining a plurality of applicable technical services for provisioning the network service request includes:
receiving from the plurality of network service providers indications of respective network services provided by each of the network service providers;
receiving from the plurality of network service providers respective dependencies between different network services applicable to the respective network services provided by each of the network service providers; and
determining the plurality of applicable technical services based on the respective dependencies between different network services.

3. The method of claim 1 wherein the determining the plurality of applicable technical services for provisioning the network service request includes:
determining that the dependencies indicate a first technical service required for provisioning the network service is dependent on one or more additional technical services in one or more corresponding different network domains; and
selecting a sub-set of technical services including the first technical service and the one or more additional technical services in one or more corresponding different network domains based on the dependencies.

4. The method of claim 1 wherein the receiving run-time feedback at the universal network orchestrator regarding operation of the network service includes:
for each applicable technical service of the determined plurality of applicable technical services, receiving operation payload data regarding run-time status of the network service from a respective service provider that provides the applicable technical service.

5. The method of claim 1 wherein the mapping the plurality of wireless network underlying technical service categories to a plurality of corresponding user template selectable options includes:
determining technical requirements of a selectable option based on the business logic;
determining a combination of technical service categories that are applicable to provisioning a network service that implements the selectable option; and
mapping the determined combination of technical service categories to the selectable option.

6. The method of claim 1 further comprising determining an inventory definition per wireless network underlying technical service category of the plurality of wireless network underlying technical service categories to determine available network resources.

7. The method of claim 1 wherein the determining the plurality of applicable technical services for provisioning the network service request includes:
receiving an indication that the plurality of network service providers has changed;
automatically changing the mapping of the technical service categories and dependencies between different technical services based on the indication that the plurality of network service providers has changed; and determining the plurality of applicable technical services for provisioning the network service request based on the changed mapping of the technical service categories and dependencies between different technical services.

8. The method of claim 1 further comprising:
providing an instance of the universal network orchestrator to one or more of the plurality of network service providers, enabling each network service provider of the one or more of the plurality of network service providers to repeat the universal network orchestrator within a system of the network service provider and provide an underlying technical service by recursively utilizing the instance of the universal network orchestrator.

9. A system for an open framework for a universal orchestrator for a services platform in a wireless network, the system comprising:
at least one computer processor; and
at least one non-transitory computer-readable storage medium having computer-executable instructions stored thereon that, when executed by the at least one processor, cause operations to be performed, the operations including:
mapping a plurality of wireless network underlying technical service categories to a plurality of corresponding user template selectable options that are based on business logic for provisioning network service requests, wherein the mapping includes mapping each wireless network underlying technical service category of the plurality of wireless network underlying technical service categories to a respective corresponding user template selectable option of the plurality of corresponding user template selectable options and the underlying technical service categories are associated with underlying different technical services which cross a plurality of network domains and a plurality of network service providers that provide the underlying technical services;
providing a user interface that includes the selectable options;
receiving a network service request for a network service including option selections of one or more of the selectable options corresponding to requirements of the network service request;
determining a plurality of applicable technical services for provisioning the network service request based on the mapping of the technical service categories and dependencies between different technical services;
generating one or more service orders for the network service based on the determined plurality of applicable technical services and available network resources indicated by network inventory;
provisioning the network service by inputting the one or more service orders to a configuration-driven universal network orchestrator having an open framework that enables recursive usage from multiple layers of service relay; and
receiving at the universal network orchestrator run-time feedback including closed loop service monitoring regarding operation of the network service, enabling the configuration-driven universal network orchestrator to make applicable adjustments in the provisioning of the network service.

10. The system of claim 9 wherein the determining a plurality of applicable technical services for provisioning the network service request includes:

receiving from the plurality of network service providers indications of respective network services provided by each of the network service providers;
receiving from the plurality of network service providers respective dependencies between different network services applicable to the respective network services provided by each of the network service providers; and
determining the plurality of applicable technical services based on the respective dependencies between different network services.

11. The system of claim 9 wherein the determining the plurality of applicable technical services for provisioning the network service request includes:
determining that the dependencies indicate a first technical service required for provisioning the network service is dependent on one or more additional technical services in one or more corresponding different network domains; and
selecting a sub-set of technical services including the first technical service and the one or more additional technical services in one or more corresponding different network domains based on the dependencies.

12. The system of claim 9 wherein the receiving run-time feedback at the universal network orchestrator regarding operation of the network service includes:
for each applicable technical service of the determined plurality of applicable technical services, receiving operation payload data regarding run-time status of the network service from a respective service provider that provides the applicable technical service.

13. The system of claim 9 wherein the mapping the plurality of wireless network underlying technical service categories to a plurality of corresponding user template selectable options includes:
determining technical requirements of a selectable option based on the business logic;
determining a combination of technical service categories that are applicable to provisioning a network service that implements the selectable option; and
mapping the determined combination of technical service categories to the selectable option.

14. The system of claim 9 wherein the feedback is part of a closed loop through the configuration-driven universal network orchestrator to make adjustments in the provisioning of the network service during run-time.

15. A non-transitory computer-readable storage medium having computer-executable instructions stored thereon that, when executed by at least one processor, cause operations to be performed, the operations including:
mapping a plurality of wireless network underlying technical service categories to a plurality of corresponding user template selectable options that are based on business logic for provisioning network service requests, wherein the mapping includes mapping each wireless network underlying technical service category of the plurality of wireless network underlying technical service categories to a respective corresponding user template selectable option of the plurality of corresponding user template selectable options and the underlying technical service categories are associated with underlying different technical services which cross a plurality of network domains and a plurality of network service providers that provide the underlying technical services;
providing a user interface that includes the selectable options;

receiving a network service request for a network service including option selections of one or more of the selectable options corresponding to requirements of the network service request;

determining a plurality of applicable technical services for provisioning the network service request based on the mapping of the technical service categories and dependencies between different technical services;

generating one or more service orders for the network service based on the determined plurality of applicable technical services and available network resources indicated by network inventory;

provisioning the network service by inputting the one or more service orders to a configuration-driven universal network orchestrator having an open framework that enables recursive usage from multiple layers of service relay; and receiving at the universal network orchestrator run-time feedback including closed loop service monitoring regarding operation of the network service, enabling the configuration-driven universal network orchestrator to make applicable adjustments in the provisioning of the network service.

16. The non-transitory computer-readable storage medium of claim 15 wherein the determining a plurality of applicable technical services for provisioning the network service request includes:

receiving from the plurality of network service providers indications of respective network services provided by each of the network service providers;

receiving from the plurality of network service providers respective dependencies between different network services applicable to the respective network services provided by each of the network service providers; and determining the plurality of applicable technical services based on the respective dependencies between different network services.

17. The non-transitory computer-readable storage medium of claim 15 wherein the determining the plurality of applicable technical services for provisioning the network service request includes:

determining that the dependencies indicate a first technical service required for provisioning the network service is dependent on one or more additional technical services in one or more corresponding different network domains; and selecting a sub-set of technical services including the first technical service and the one or more additional technical services in one or more corresponding different network domains based on the dependencies.

18. The non-transitory computer-readable storage medium of claim 15 wherein the receiving run-time feedback at the universal network orchestrator regarding operation of the network service includes:

for each applicable technical service of the determined plurality of applicable technical services, receiving operation payload data regarding run-time status of the network service from a respective service provider that provides the applicable technical service.

19. The non-transitory computer-readable storage medium of claim 15 wherein the mapping the plurality of wireless network underlying technical service categories to a plurality of corresponding user template selectable options includes:

determining technical requirements of a selectable option based on the business logic;

determining a combination of technical service categories that are applicable to provisioning a network service that implements the selectable option; and mapping the determined combination of technical service categories to the selectable option.

20. The non-transitory computer-readable storage medium of claim 15 wherein the feedback is part of a closed loop through the configuration-driven universal network orchestrator to make adjustments in the provisioning of the network service during run-time.

* * * * *